United States Patent

[11] 3,627,692

[72] Inventors Robert C. Ohlmann
Palo Alto, Calif.;
Robert Mazelsky, Monroeville, Pa.
[21] Appl. No. 732,593
[22] Filed May 28, 1968
[45] Patented Dec. 14, 1971
[73] Assignee Westinghouse Electric Corporation
Pittsburgh, Pa.

[54] FLUOROAPATITE LASER MATERIAL DOPED WITH HOLMIUM OR THULIUM AND CHROMIUM
13 Claims, 4 Drawing Figs.
[52] U.S. Cl. ........................................................ 252/301.4 P
[51] Int. Cl. ........................................................ C09k 1/04, H01s 3/16
[50] Field of Search ........................................... 252/301.4; 331/94.5

[56] References Cited
UNITED STATES PATENTS
3,405,371 10/1968 Johnson et al. ................ 252/301.4

Primary Examiner—Robert D. Edmonds
Attorneys—F. Shapoe and Alex Mich, Jr.

ABSTRACT: A crystalline material suitable for use as a laser rod in association with pump radiation is made from a calcium or strontium fluorophosphate host which is doubly doped with holmium and chromium or thulium and chronium and which can contain charge-compensating constituent ions such as $Na^+$, $O^-$ and $(SiO_4)^{4-}$ troneutrality of the crystal.

FLUOROAPATITE LASER MATERIAL DOPED WITH HOLMIUM OR THULIUM AND CHROMIUM

BACKGROUND OF THE INVENTION

This invention relates to laser crystals, particularly those for use in a resonant cavity of an optically pumped laser generator. More particularly, this invention relates to a material suitable for laser application comprising crystalline host materials such as calcium or strontium fluorophosphate which are doubly doped with a rare-earth constituent ion, such as Ho or Tm as a substitute for a minor portion of the calcium in the host and Cr as a transition metal ion. The chromium probably is in the form of $Cr^{3+}$ or $CrO_4^{---}$ as a substitute for a minor portion of calcium in the former case and a minor portion of the phosphate in the host in the latter case.

In order to realize fully the potential of lasers for many applications, it is desirable to have a small, low-threshold, high-efficiency device capable of relatively high output power, either pulsed or continuous.

It is well known that lasers which are excited by optical pumping, either with a flashlamp or a continuous lamp, have output efficiencies (laser output per electrical input) generally less than 5 percent, and often less than 1 percent. This low efficiency has the disadvantage of requiring larger power supplies and more heat removal than would otherwise be necessary. It also limits the maximum possible output energy since flashlamps are structurally limited in the maximum energy or power they can accept and pass onto the laser rod.

One of the major reasons for this low efficiency is the fact that, although up to 40 percent of the electrical power is converted into pumping radiation incident on the laser rod, the material absorbs only a small fraction of this radiation. The rest of the radiation passes through the material and is wasted heating the cavity walls or supporting members.

Using the most optimum conditions, the present state of the art is such that no more than 25 percent of the incident radiation is absorbed, while with realistic pumping conditions only 5 to 10 percent is absorbed. The reason for this low absorption of radiation by laser materials is that they tend to have sufficient absorption strength only over very limited wavelength regions, while the radiation from the pumping lamp is broadband, i.e., covers a large spectral region. Therefore, a large fraction of the exciting light is at wavelengths at which the laser material is transparent.

A more precise reason for low absorption is that the active ions in low-threshold laser crystals are rare-earth ions with absorption lines having relatively narrow spectral widths. However, flashlamps and tungsten lamps have continuous emission spectra so that much of the lamp radiation is at wavelengths not absorbed by the active ions.

SUMMARY OF THE INVENTION

Accordingly, it is the object of this invention to provide a new and improved crystalline material suitable for use as a laser rod and having high efficiencies.

This invention accomplishes the foregoing object by providing a crystalline material that absorbs up to 50 percent of the incident radiation from laser pumping sources. This material, when fabricated into a laser rod, is capable of showing laser efficiencies over 15 percent, a figure equal to two to three times the present state of the art.

The preferred material consists of a calcium fluorophosphate host, $(Ca_5(PO_4)_3F)$, which is doubly doped with holmium and chromium. This material can self-compensate for charge imbalance caused by the doping constituents by eliminating calcium in the lattice as the crystal grows or by adding oxygen during crystal growth from water vapor available in the air. Examples of two preferred laser self-charge-compensated materials of this invention are $Ca_{4.92}Ho_{0.075}Cr_{0.005}(PO_4)_3F_{0.92}O_{0.08}$ and $Ca_{4.88}Ho_{0.075}Cr_{0.005}(PO_4)_3F$. These specific materials have $CR^{3+}$ ions substituting for calcium in the crystal lattice and can be represented in chemical form as either (1) $Ca_{5s-x-s}Ho_{2x/3}Cr_{2s/3}(PO_4)_3F$ or (2) $Ca_{5-x-s}Ho_xCr_s(PO_4)_3F_{1-x-s}O_{x+s}$.

Similarly, strontium fluorophosphate, doubly doped with holmium and chromium, and either calcium fluorophosphate or strontium fluorophosphate doped with thulium and chromium produce substantially the same effects and are part of this invention. The compensating mechanism discussed above is also applicable to these materials.

BRIEF DESCRIPTION OF THE DRAWINGS

For a better understanding of the nature and objects of the invention, reference may be had to the following drawings, in which.

DESCRIPTION OF THE PREFERRED EMBODIMENTS

Energy transfer from one fluorescent specie to another, or among fluorescent species of the same kind, is a fundamental process in luminescence. Before the advent of lasers, energy transfer was widely utilized in commercial phosphors such as those used in fluorescent lamps to improve their efficiency, and extensively studied in connection with organic phosphors. With the advent of lasers, energy transfer processes have taken on additional importance as a means for improving the efficiency of optically pumped lasers. The work on fluorescent lamps was concerned mainly with the transfer of energy between transition metal ions of different types. In contrast, investigations on laser materials has been principally concerned with energy transfer from transition metal ions such as titanium, vanadium, chromium, manganese, iron, cobalt and ruthenium to rare-earth ions such as neodymium, holmium, thulium and europium, or energy transfer from rare-earth to rare-earth ions.

The basic aim of energy transfer can be described as follows: given an ion which has desirable fluorescent properties (i.e., it emits in a desirable frequency region with a suitable bandwidth) but which is only a weak or inefficient absorber of the excitation energy, one must find another ion, which has desirable absorption properties and which can transfer its energy efficiently and rapidly to the emitting ion. The emitting ion is called the activator and the absorbing ion is called the sensitizer. Energy transfer occurs from the sensitizer to the activator ion.

Although a number of energy transfer processes are known, and understood, they may be initially divided into two general categories: radiative transfer and nonradiative transfer.

Radiative transfer consists of the following steps: (1) The sensitizer absorbs a photon. (2) The sensitizer emits a photon at some wavelength within its emission band. (3) The emitted photon is directly absorbed by an absorption band of the activator whose spectral location and width overlap in energy the emission band of the sensitizer. (4) The activator then emits a photon which will be at the same or a longer wavelength than the absorbed photon.

In radiative transfer, since no direct interaction between sensitizer ions and activator ions is present, except through the emitted photons, transfer yields are limited to the value of the overlap integral and by the fluorescence efficiency of the sensitizer.

Figure 1:
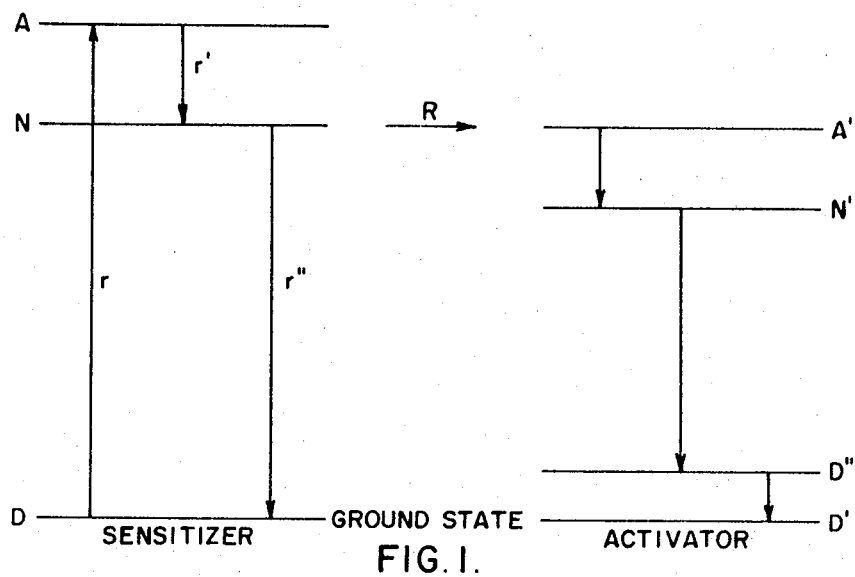
FIG. 1 shows energy levels of sensitizer and activator ions indicating transitions pertinent to energy transfer.

In general, radiative transfer processes are less efficient and slower than the nonradiative processes described below. FIG. 1 illustrates the various steps involved in nonradiative transfer: (1) The sensitizer absorbs a photon of external radiation of energy $r$, lifting it from the sensitizer ground state D to an excited state A. (2) The sensitizer subsequently decays to a lower metastable state N, by the emission of a photon $r'$ or by a nonradiative process. (3) Once lattice relaxation about the sensitizer metastable state has taken place, the sensitizer is either free to radiate a photon $r''$ or to transfer its energy to an activator, as indicated by R. (4) If the electronic transitions in both the sensitizer and activator are electric dipole transitions, the dipole field of the excited sensitizer can introduce a dipole transition in a nearby activator, thereby raising the activator to an excited state A', with a simultaneous return of the sensitizer to its ground state. (5) This transition transfers a quantum of energy from the sensitizer to the activator. Once excited, the activator can decay to a lower metastable level N', through emission of photons, and can eventually decay to its ground state D' either directly or via an intermediate level D''. Reference may be had to D. L. Dexter, J. Chem. Phys. Vol. 21, 1953, page 836 for detailed descriptions of these energy transfer processes.

The requirements in nonradiative transfer for efficient transfer of energy from sensitizer to activator are: (1) a reasonable overlap in energy between the sensitizer emission band and an absorption band of the activator, (2) high oscillator strengths in both sensitizer and activator and (3) a relatively high intrinsic radiative quantum efficiencies for both the sensitizer and activator. In addition to the above criteria, there are several other criteria of a more general nature for a useful sensitizer. These are: (1) The sensitizer should adsorb radiation in a spectral region where the activator has little or no absorption. (2) The sensitizer should absorb in a region where the pump lamp radiates appreciable energy, and (3) The sensitizer should not absorb where the activator emits, or have any adverse affects on the radiative efficiency of the activator.

Most of the materials for optically pumped lasers use as their active ion, one or another member of the rare-earth family of ions. The rare-earths consist of elements in which all of the shells through the $4d$ shell are completely filled. In addition, the $5s$, $5p$ and $6s$ shells are filled, leaving a $5d$ and an empty $4f$ shell for the neutral atom at the start of the rare-earth series. The rare-earth ions are formed from the progressive filling of the $4f$ shell. Ionization of a rare-earth to the divalent state consists in ionizing the $6s^2$ electrons. The $5d^1$ electron, if present, ends up in the $4f$ shell. Ionizing a rare-earth to the trivalent state (which is the most stable form of most rare-earth ions) consists in a loss of the $6s^2$ electrons, and in addition, either the $5d^1$ electron or a $4f$ electron. Reference may be had to the *Handbook of Chemistry and Physics*, Chemical Rubber Publishing Co., 43rd Edition, 1962, page 403, for the electronic configuration of the elements. The two rare-earth activator ions used in this invention are holmium ($Ho^{3+}$) and thulium ($Tm^{3+}$), The ion concentration of thulium and holmium can vary in the host from about 0.2 to 5 atom percent of the calcium or strontium cation sites in the host. Below this range there is not enough electron inversion and above this range there is serious concentration quenching. Thus, in one of the typical formulations of this invention, $Ca_{5-x-s}A_xCr_s(PO_4)_3F_{1-x-s}O_{x+s}$, where A represents either Ho or Tm, $x$ has a value between 0.01 and 0.25, i.e., 0.25=$x$/5 cation sites = 5 atom percent and 0.01=$x$/5 cation sites = 0.2 atom percent. The preferred ion concentration of holmium and thulium is about 1.5 atom percent of the calcium or strontium cation sites in the host.

In accordance with this invention, the transition metal ion chromium is used to sensitize the rare-earth ions. For efficient energy transfer to occur it is necessary that the rate of transfer (R in FIG. 1) be more rapid than the rate of decay of the sensitizer to its ground state ($r''$ in FIG. 1). The chromium ion ($Cr^{3+} \cdot Cr^{5+}$ as $(CrO_4)^{-3}$ or both together) meets these transfer requirements. The chromium ion concentration can vary from about 0.01 atom percent to the limits of solid solubility (about 1 atom percent). Below this range absorption and energy transfer is limited. If $Cr^{3+}$ is the ion used then the atom percent is with respect to the calcium or strontium cation sites. If $(CrO_4)^{-3}$ is the ion used then the atom percent is with respect to phosphate sites in a molecule of fluorapatite. The preferred concentration is about 0.1 atom percent. Thus in the typical formulation of this invention, $Ca_{5-x-s}A_xCr_s(PO_4)_3F_{1-x-s}O_{x-s}$, chromium is found as $Cr^{3+}$ ion and the range of $s$ varies between 0.0005 to 0.05, the latter figure being about the limit of solid solubility.

Fluorapatite, also referred to as calcium fluorophosphate $(Ca_5(PO_4)_3F)$, is one of the host crystals of this invention. It was also found that a related material wherein strontium replaced calcium in the above formula $(Sr_5(PO_4)_3F)$ was a suitable host.

The host crystals of this invention contains ion sites which will accommodate both rare-earth and transition metal ions.

The crystal structure of $Ca_5(PO_4)_3F$ is hexagonal. It has a unit cell formula of $Ca_{10}(PO_4)_6F_2$. The Ca ions are found in two site symmetries—40 percent in CaI sites of $C_3$ symmetry six coordinated by oxygen, and 60 percent on CaII sites of $C_{1h}$ symmetry, with fluorine as one neighbor and several oxygen neighbors. There is some evidence that rare-earth ions go into both sites although the CaII site is preferred. Reference may be had to R. W. G. Wyckoff, *Crystal Structures*, Interscience, Vol. 3, Chapter 8, 1960 page 243 for further details in this area.

Figure 2:
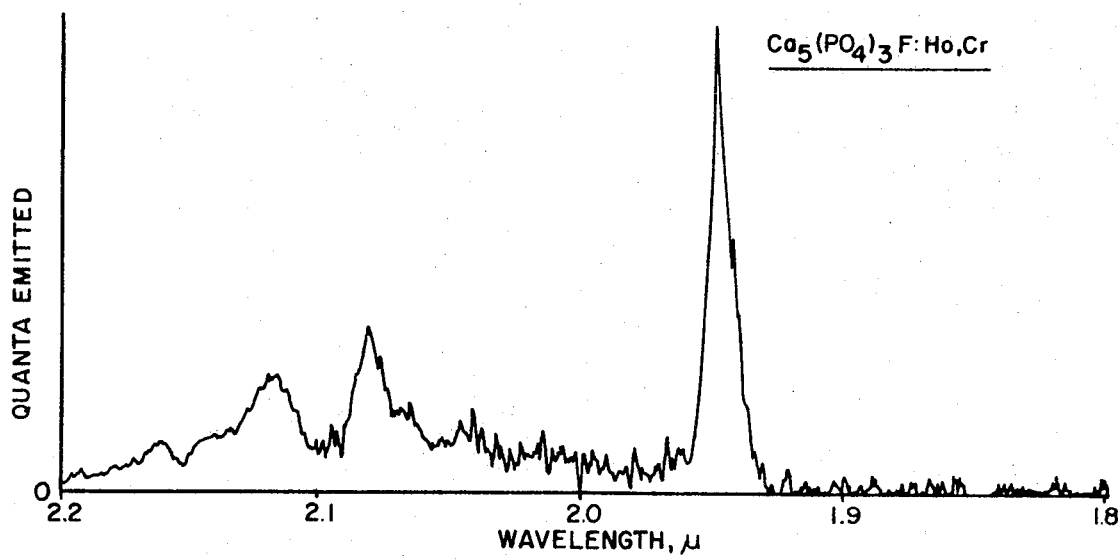
FIG. 2 shows the fluorescence spectrum of Ho,Cr doped $Ca_5(PO_4)B3F$ at 77° K.

Trivalent holmium as an impurity in calcium fluorophosphate, has a large number of energy levels due to the $4f^{10}$ electron configuration. Transitions from the ground state to higher states occur upon the absorption of light at several discrete wavelengths lying between 2 microns and 0.4 microns. The excited holmium ions fluoresce both in the visible and the near infrared spectral regions. The infrared fluorescence involves transitions between levels whose populations may be inverted with sufficient excitation. Upon population inversion these ions will partake in stimulated emission or laser action. FIG. 2 shows the fluorescence spectrum due to trivalent holmium obtained from a crystal of $Ca_5(PO_4)_3F$ doubly doped with holmium and chromium, the crystals being held at 77° K.

The strongest line in FIG. 2 occurs at 1.948 microns (5133cm.$^{-1}$ in energy units). The lower state of the transition causing this fluorescence is either the ground state or within several wave numbers in energy of the ground state. Therefore, laser action involving this transition will b "three-level," even at 77° K. However, the fluorescence at 2.08 microns is a result of a transition ending 325 cm.$^{-1}$ above the ground state so that a "four-leverl" laser is possible at 77° K. using that transition. Reference may be had to W. V. Smith at al. *The Laser*, McGraw-Hill, 1966, pages 66–76 for a discussion of threshold pumping power and four-level solid-state lasers.

Figure 3:
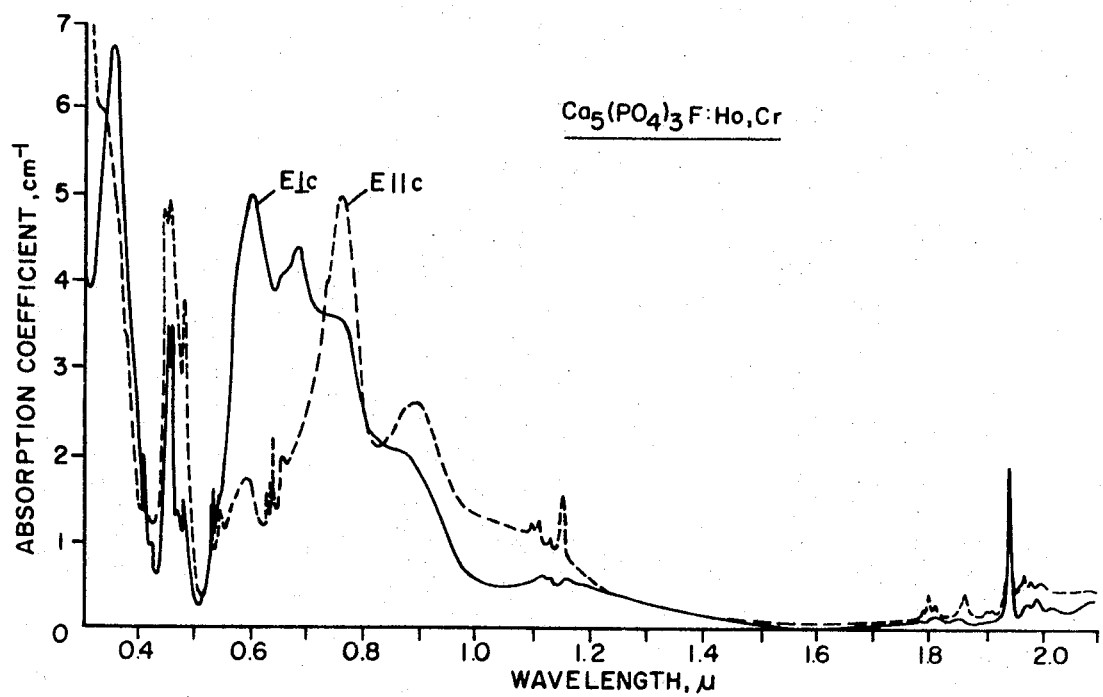
FIG. 3 shows the absorption spectrum of Ho,Cr doped $Ca_5(PO_4)B3F$ at 300° K.

The absorption spectra for light polarized perpendicular and parallel to the $c$-axis of the crystal is shown in FIG. 3. The sharp lines are due to holmium absorption while the broad bands between 0.5 and 1.4 microns are due to chromium The chromium absorption increases upon heating in air and decreases upon heating in hydrogen. This suggests that pentavalent chromium is the cause of the absorption.

Figure 4:
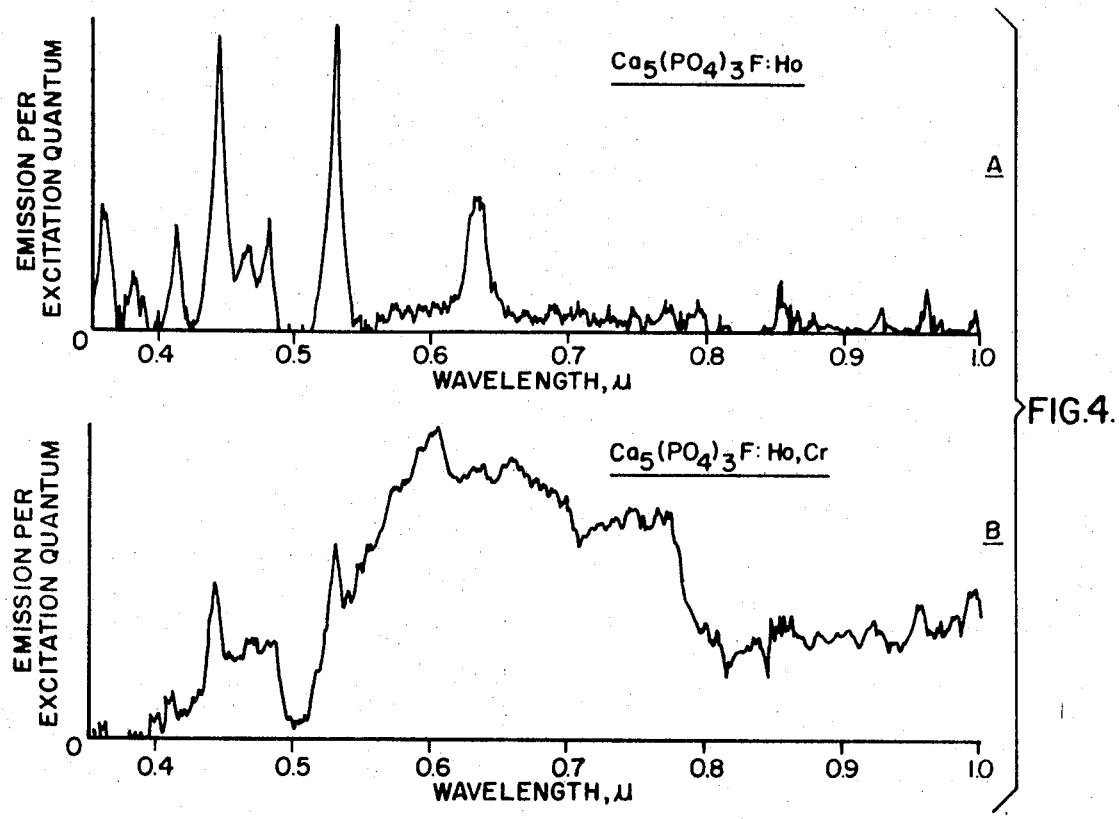
FIG. 4 shows excitation spectra of the infrared fluorescence from $Ho^{3+}$ in $Ca_5(PO_4)_3F$ doped with Ho and doped with Ho and Cr.

When radiation energy is absorbed by the chromium ions, the energy is transferred to the holmium ions and results in fluorescence. FIG 4 shows the excitation spectra of the infrared fluorescence from holmium from two samples, one singly doped with holmium (1 atom percent), curve A and the other doubly doped with holmium (1 atom percent ) and chromium (0.1 atom percent) curve B. It is evident that the broad absorption bands due to chromium are effective in exciting fluorescence. The doubly doped sample will absorb up to 50 percent of the radiation from a broadband source such as a xenon or tungsten lamp.

The absorption coefficient of the line for $Ca_5(PO_4)_3F$: Ho(1.5 atom percent)Cr(0.1 atom percent), as shown in FIG. 3 at 1.948 microns is at least 2cm.$^{-1}$ at 300° K. for a holmium concentration of $2 \times 10^{20}$ ions/cm.$^3$ The absorption coefficient may be an order of magnitude higher since the measuring instrument only had a 5 A. resolution. Since this line is also observed in emission, the gain for a 100 percent inversion would be 2 to 20 cm.$^{-1}$. Since only 0 .1 cm.$^{-1}$ gain is necessary for threshold in a 5 cm. laser rod with a 95 percent reflecting output mirror, this means that the required population inversion is between $10^{18}$ and $10^{19}$ ions/cm.³. However, as a three-level laser, the ground state must first be half depopulated, i.e., $10^{20}$ ions/cm.³ must be excited. The material may be operated as a four-level laser system at 77° K. using the emission line of FIG. 2 at 2.08 microns. Since its gain is somewhat smaller, between $3\times10^{18}$ and $3\times10^{19}$ ions/cm.³ must be excited.

The laser threshold of $Ca_5(PO_4)_3F:Ho(1.5$ atom percent) $Cr(0.1$ atom percent) may be calculated by comparison with neodymium doped calcium fluorophosphate. In that material about $3\times10^{17}$ ions/cm.³ are excited in a laser head using a few joules into a xenon flashlamp having a millisecond pulse length. Since the neodymium doped crystal has a 0.2-millisecond fluorescence decay time while the holmium doped crystal may have a 1-millisecond decay time, five times the inversion should result in the holmium doped crystal for the same absorbed energy. In addition, at least three times as much energy should be absorbed. Therefore, $5\times10^{18}$ holmium ions/cm.³ should be inverted with a few joules into the flashlamp, approximately sufficient for four-level laser oscillations at 77° K. The laser thresholds for this new material are thus calculated to be less than 10 joules at 77° K. and less than 300 joules at room temperature.

A large fraction of the incident energy from a broadband source will continue to be absorbed after laser threshold is reached. Therefore differential (slope) efficiencies for laser action of over 15 percent are expected. Since excitation at 10 times threshold is easily obtainable with flash excitation, overall efficiencies of greater than 13 percent will be obtainable in pulse operation. In continuous operation at 77° K., the overall efficiency will be somewhat less since the threshold power cannot be greatly exceeded.

In the preparation of the laser rod material of this invention 3.000 moles $CaHOP_4$, 0.500 mole $CaF_2$, 1.4575 moles $CaCO_3$, 0.0375 mole $Ho_2O_3$, 0.0025 mole $Cr_2O_3$, all powders of about 99.9 percent purity, were mixed together and melted in an iridium crucible. An approximate melting point of 1645° C. was obtained by means of platinum-rhodium alloy thermocouple measurements.

Crystals were pulled from the melt at about 1665° C. using the standard Czochralski technique, well known in the a art and described in an article by J. Czochralski in Zeitschrift fur Physikalische Chemie, Vol. 92, pages 219–221 (1918). A recent description of the process is found in an article by H. Nassau and L. G. Van Uitert in Journal of Applied Physics, Vol. 31, page 1508 (1960). The power source was a Westinghouse 30 kw. motor-driven 10 kHz. generator. The pulling apparatus was designed such that 131 rates between 1 and 40 mm./hr. and rotation speeds of 10–110 r.p.m. could be used. Temperature is controlled by using the output of a sapphire light pipe radiamatic detector and feeding it into an L and N Azar recorder controller. The voltage from the recorder controller in association with an L and N current-adjusting type relay supplies the input circuit of a Norbatrol linear power controller. The Norbatrol output voltage supplies the necessary field excitation required by the 10 $KH_z$ generator. Crystals were grown of approximately ¼-inch diameter and 1–3 inch length. Cooling rates of the pulled crystals varied from 2 to 6 hours.

The crystalline materials of this invention are useful in simple lasers as a laser rod and in more complicated laser applications such as Q-switched lasers, both of which are described in detail in chapters 3 and 4 of *The laser* by W. V. Smith and P. P. Sorokin, McGraw-Hill, 1966, incorporated herein by reference.

Absorption spectra of the $Ca_5(PO_4)_3F:Ho(1.5$ atom percent) $Cr(0.1$ atom percent) laser crystals were measured on a Cary Model 14 commercial spectrometer, modified so that Glan Thompson polarizers could be used. The Cary spectrometer also had a tungsten iodide cycle lamp and a special phototube with an S-20 response.

The excitation and fluorescence spectrometer system consisted of two grating monochromators for dispersing the exciting light and the fluorescence light, along with associated optics, detectors, lamps and electronics.

The source used was an Osram Type XBO-900, a high-pressure xenon arc lamp which is operated from a DC supply having less than 1 percent ripple. Fluorescence measurements were made using a Jarrell-Ash monochromator. A 600 l./mm. grating blazed at 4,000 A. allows excitation spectra to be taken from 2,500 to 10,000 A. The quantum detectors consisted of a PbS cell cooled to liquid $N_2$ temperature.

In conclusion, suitable materials for use as laser crystals of high laser efficiencies include not only self-compensating crystalline materials but also formulations wherein charge deficiency is deliberately compensated for.

It is a corollary of materials preparation rules that electroneutrality must be preserved in any compound. When one considers the host compound $Ca_5(PO_4)_3F$ we must consider equal numbers of positive and negative charges. With oxidation states of +2, −3, and −1, for calcium, phosphate, and fluoride ion respectively, there will be a total of 10 negative and 10 positive charges in a molecule of fluorapatite. When the laser material $Ca_5(PO_4)_3F:Ho,Cr$ is considered, it is understood that the doping ions (Ho,Cr) will enter the lattice either at a hole in the lattice (interstitially) or replacing an ion at one of the lattice sites (substitutionally). It is believed that the doping ion enter the lattice substitutionally. Since both holmium and chromium are usually tripositive ions and there are no tripositive sites in the lattice, some form of charge compensation must take place.

If a tripositive ion, Ho or Tm, is designated as A, it is possible to construct formulas to designate mechanisms by which the lattice can self-compensate for the charge imbalance. For example, neglecting Cr ions, a cation vacancy can be formed;

$$Ca_{5-x}a2xT3PO_4)_3F \text{ and vacancy concentration } x/3$$

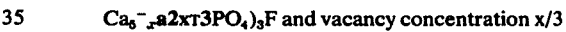

The vacancy will carry a neutral charge. The total number of negative charges will be 10 and a like number of positive charges must be present.

$$(+2)(5-X)+(+3)(\,)2x13)+0 \text{ (vacancy conc.)}=10-2x+2x=10.$$

Therefore, when a material is prepared without a specific mechanism to compensate charge, the lattice may adjust the charge itself or self-compensate by the creation of vacancies. These vacancies may possibly have a deleterious effect on the optical properties of the crystal in that the vacant site may be a mechanism for producing color centers. We have not observed any harmful effects from the formation of vacancies.

One can derive another picture for self-compensation at which the lattice, rather than create a vacant lattice site, will charge compensate by selectively adding an available ion to the lattice. For example, neglecting Cr ions again:

$$Ca_{5-x}A_x(PO_4)_3F_{1-x}O_x.$$

The positive charges will be $$(+2)(5-x)+(+3)(x)=10-2x+3=+(10+x).$$

The negative charges will be $$(-3)(3)+(-1)(1-x)+(-2)(x)=-9-1+x-2x=-(10+x).$$

Therefore electroneutrality will be retained and no vacancies will be formed. If the energy required to perform this substitution is less than that needed for vacancy formation, then this mechanism may occur. Of course, it is possible to deliberately add oxide ions to the system in which case it would be *deliberate* compensation. However, the lattice can do this alone by taking oxide ions from the environment. For example, during growth there is water vapor available in the air which could be accommodated into the lattice by the reaction $$H_2O+2F^-\rightarrow 2HF+0^{-2}.$$

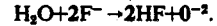

Another environmental source is available in the chemical equilibria involved with phosphate ion $$2PO_4^{-3}\rightarrow P_2O_7^{-4}+O^{116\ 2}.$$

Since only small amounts of oxide ion are needed, and the reservoir of material is large, the composition of the melt would not be seriously affected by this reaction.

One other thing to consider is the possible change in oxidation state. Unlike the rest of the cation species, chromium has more than one stable oxidation state. As least four other states are reported $Cr^{3+}$, $Cr^{4+}$, $Cr^{5+}$, $Cr^{6+}$. In the lattice they would most likely be present as $Cr^{+2}$, $CrO_4^{-4}$ and $(CrO_4)^{3-}$. The states $Cr^{2+}$ replacing calcium and $(CrO_4)^{3-}$ replacing $(PO_4)^{3-}$ and and would not require charge compensation. However, on the basis of the chemistry of the ions, we consider the chromium to be primarily trivalent with the possibility of minor amounts of chromium in another oxidation state.

In the above discussion chromium substitution was not discussed. Such substitutions of either $Cr^{3+}$ or $CrO_4^-$ are of course important and must be included in any general formula representing the self-compensating crystals of this invention. Therefore the general formula for $Cr^{3+}$ substitution is either $M_{5-x-s}A_{2x/3}Cr_{25/3}(PO_{14})_3F$ or $M_{5-x-s}A_xCr(PO_4)_3F_{1-x-s}O_{x+s}$ where M is selected from either Ca or Sr, A is selected from either Ho or Tm, $x$ can very from 0.01 to 0.25 and $s$ can vary from 0.005 to 0.05.

The general formula for $Cr_{O_4}^{---}$ is either $M_{5-x}A_{2x/3}(PO_4)_{3-s}(CrO_4)_sF$ or $M_{5-x}A_x(PO_4)_{3-s}(CrO_4)_sF_{1-x}O_x$ where the values of M, A, $x$ and $s$ are the same as above.

While the foregoing materials are suitable, it is also possible to compensate the charge imbalance by suitable partial substitutions of charge compensating constituents; i.e., $Na^+$, $K^+$, $Rb^+$ can be substituted for minor portions of calcium or strontium, $O^{--}$ or $S^{--}$ can be substituted for minor portions of fluoride and tetravalent ions of silicon and germanium can be substituted for minor portions of phosphorous. It is also possible to have combinations of charge-compensating formulations. All such substitutions would be apparent to one skilled in the art and such variations are considered within the scope of this invention. The atom percent of these substitutions should correspond to the atom percent of rare-earth activator ion present. Examples of some of these compounds would include: $Ca_{4.9}Ho_{0.1}(PO_4)_3F_{0.9}O_{0.1}$:CR; $Ca_{4.9}Ho_{0.1}(PO_4)_3F_{0.9}S_{0.1}$:Cr, $Ca_{4.8}Na_{0.1}Ho_{0.1}(PO_4)_3F$:Cr, $Ca_{4.8}K_{0.1}HO_{0.1}Ho_{0.1}(PO_4)_3F$:Cr; $Ca_{4.8}Rb_{0.1}Ho_{0.1}(PO_4)_3F$:Cr; $Ca_{4.9}Ho_{0.1}(PO_4)_{2.9}(SiO_4)_{0.1}F$:Cr; and $Ca_{4.9}Ho_{0.1}(PO_4)_{2.0}(GeO_{40.1}F$:Cr. The ion substitutes in these compounds can vary through the same range as the rare-earth ions (from about 0.2 to 5 atom percent). These materials are prepared using the same Czochralski technique heretofore described.

A general formula which represents the deliberate charge-compensated laser materials of this invention is: $M_{5-x-w}A_xL_w(PO_4)_{3-y}(RO_4)_yF_{1-z}C_z$:$Cr_s$ where M=Ca or Sr,
A=Ho or Tm,
L=Na, K or Rb
R=Si or Ge and
C=O or S.

In the formula $w$, $y$ and $z$ can vary from 0 to 0.25, $x$ can vary from 0.01 to 0.25 (0.2 to 5 atom percent of the 5 M cation sites) and $s$ can vary from 0.0005 to 0.05 (0.01 to 1 atom percent of the 5 M cation sites).

While the invention has been described with reference to specific compositions, it will be understood, of course, that other variations are possible and should be considered within the scope and spirit of this invention.

We claim as our invention:

1. A composition suitable for laser action comprising an apatite crystalline material selected from the group consisting of calcium fluorophosphate Ho strontium fluorophosphate containing (1) at least one rare-earth lasing ion selected from the group consisting of holmium and thulium and (2) chromium ion, said chromium ion capable of (a) absorbing radiation energy not absorbed by said rare-earth lasing ion and (b) transferring absorbed energy to sensitize said rare-earth lasing ion, said chromium ion being present in an amount sufficient to sensitize said rare-earth lasing ion and cause laser action.

2. The composition of claim 1 wherein said apatite crystalline material is calcium fluorophosphate.

3. The composition of claim 2 wherein the apatite crystalline material is calcium fluorophosphate, and the rare-earth lasing ion is $Ho^{3+}$.

4. The composition of claim 3 wherein the concentration of $Ho^{3+}$ is in the range from about 0.2 to 5 atom percent of the calcium sites in the apatite crystalline material.

5. The composition of claim 4 wherein the chromium ion is $Cr^{3+}$ and the concentration of $Cr^{3+}$ is in the range from about 0.01 to 1 atom percent of the calcium sites in the apatite crystalline material.

6. The composition of claim 1 having an electroneutrality provided by charge-compensating ions.

7. The composition of claim 6 wherein said charge-compensating ions are selected from the group consisting of Na, K, Rb, O, S, $SiO_4$ and $GeO_4$.

8. The composition of claim 1 wherein electroneutrality is provided by lattice vacancies.

9. A crystalline material for use in a resonant cavity of a laser generator, said material having the formula $M_{5-x-s}A_xCr_s(PO_4)_3F_{1-x-s}O_{x+s}$ wherein M is selected from the group consisting of Ca and Sr, A is selected from the group consisting of Ho and Tm, $x$ can vary from 0.01 to 0.25 and $s$ can vary from about 0.0005 to 0.05.

10. The crystalline material of claim 9 wherein M=Ca, A=Ho, $x$=0.075 and $s$=0.005.

11. A crystalline material for use in a resonant cavity of a laser generator, said material having the formula $M_{5-x-s}A_{2x/3}Cr_{2s/3}(PO_4)_3F$ wherein M is selected from the group consisting of Ca and Sr, A is selected from the group consisting of Ho and Tm, $x$ can vary from 0.01 to 0.25 and $s$ can vary from about 0.0005 to 0.05.

12. The crystalline material of claim 11 wherein M=Ca, A=Ho, $x$=0.1125 and $s$=0.0075.

13. A crystalline material for use in a resonant cavity of a laser generator, said material having the formula $M_{5-x-w}A_xL_w(PO_4)_{3-y}(RO_4)_yF_{1-z}C_z$:$Cr_s$ wherein M is selected from the group consisting of Ca and Sr, A is selected from the group consisting of Ho and Tm, L is selected from the group consisting of Na, K and Rb, R is selected from the group consisting of Si and Ge, C is selected from the group consisting of O and S, $x$ can vary from 0.01 to 0.25, $s$ can vary from 0.0005 to 0.05, $w$ can vary from 0 to 0.25, $y$ can vary from 0 to 0.25 and $z$ can vary from 0 to 0.25.

* * * * *

UNITED STATES PATENT OFFICE
CERTIFICATE OF CORRECTION

Patent No. 3,627,692     Dated December 14, 1971

Inventor(s) Robert C. Ohlmann and Robert Mazelsky

It is certified that error appears in the above-identified patent and that said Letters Patent are hereby corrected as shown below:

In column 1, line 75, the chemical form "$Ca_{55-x-s}Ho_{2x/3}Cr_{2s/3}(PO_4)_3F$" should read -- $Ca_{5-x-s}Ho_{2x/3}Cr_{2s/3}(PO_4)_3F$ --.

In column 6, line 35, the formula "$Ca_5^- {}_xa2xT3PO_4)_3F$" should read -- $Ca_{5-x}A_{2x/3}(PO_4)_3F$ --. In column 6, line 41, the equation "(+2)(5=X)+(+3)()2x13)+0" should read -- (+2)(5-x)+(+3)(2x/3)+0 --.

In column 7, line 16, the formulas "$M_{5-x-s}A_{2x/3}Cr_{25/3}(PO_{14})_3F$ or $M_{5-x-s}A_xCr(PO_4)_3F_{1-x-s}O_{x+s}$" should read -- $M_{5-x-s}A_{2x/3}Cr_{2s/3}(PO_4)_3F$ or $M_{5-x-s}A_xCr_s(PO_4)_3F_{1-x-s}O_{x+s}$ --.

In claim 1, column 8, line 4, the word "Ho" should be deleted and the word -- and -- substituted therefor.

Signed and sealed this 23rd day of January 1973.

(SEAL)
Attest:

EDWARD M. FLETCHER, JR.
Attesting Officer

ROBERT GOTTSCHALK
Commissioner of Patents